(12) United States Patent
Ishii et al.

(10) Patent No.: US 11,247,492 B2
(45) Date of Patent: Feb. 15, 2022

(54) IMAGE FORMING APPARATUS

(71) Applicant: KYOCERA Document Solutions Inc., Osaka (JP)

(72) Inventors: Satoshi Ishii, Osaka (JP); Motoki Suzuki, Osaka (JP); Hiroaki Watanabe, Osaka (JP); Ryota Okui, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/174,433

(22) Filed: Feb. 12, 2021

(65) Prior Publication Data

US 2021/0252878 A1    Aug. 19, 2021

(30) Foreign Application Priority Data

Feb. 13, 2020  (JP) .............................. JP2020-022563

(51) Int. Cl.
| | | |
|---|---|---|
| *B41J 11/00* | (2006.01) | |
| *B41J 2/045* | (2006.01) | |
| *G01N 21/3559* | (2014.01) | |

(52) U.S. Cl.
CPC ....... *B41J 11/0005* (2013.01); *B41J 2/04558* (2013.01); *G01N 21/3559* (2013.01)

(58) Field of Classification Search
CPC ............ B41J 11/0005; B41J 2203/011; G01N 21/3559
See application file for complete search history.

(56) References Cited

U.S. PATENT DOCUMENTS

| 10,684,218 B2 | 6/2020 | Ishimoto et al. | |
|---|---|---|---|
| 2018/0292314 A1* | 10/2018 | Ishimoto | ............ G01N 21/3151 |
| 2020/0271575 A1 | 8/2020 | Ishimoto et al. | |

FOREIGN PATENT DOCUMENTS

| JP | 2016218310 A | * 12/2016 |
|---|---|---|
| JP | 2018-180230 A | 11/2018 |

OTHER PUBLICATIONS

Shibahara, MachineTranslation ofJP-2016218310-A, 2016 (Year: 2016).*

* cited by examiner

*Primary Examiner* — Scott A Richmond
(74) *Attorney, Agent, or Firm* — Studebaker & Brackett PC

(57) ABSTRACT

A first light emitter emits light toward a sheet. A first light receiver receives first reflected light from the sheet. A second light emitter is arranged downstream of the first light emitter in a conveyance direction of the sheet and emits light toward the sheet. A second light receiver receives second reflected light from the sheet. A measuring section measures first and second received light quantities of the first reflected light and the second reflected light. A moisture content calculator calculates a change in a moisture content of the ink in the sheet based on a difference between first and second moisture contents. The first moisture content is based on the first received light quantity and the second moisture content is based on the second received light quantity. A curling amount calculator calculates a curling amount of the sheet based on the change in the moisture content.

11 Claims, 9 Drawing Sheets

IMAGE FORMING APPARATUS

INCORPORATION BY REFERENCE

The present application claims priority under 35 U.S.C. § 119 to Japanese Patent Application No. 2020-022563, filed on Feb. 13, 2020. The contents of this application are incorporated herein by reference in their entirety.

BACKGROUND

The present disclosure relates to an image forming apparatus.

SUMMARY

An image forming apparatus according to an aspect of the present disclosure includes a feeder, a conveyance section, an image forming section, a first light emitter, a first light receiver, a second light emitter, a second light receiver, a measuring section, a moisture content calculator, and a curling amount calculator. The feeder feeds a sheet. The conveyance section conveys the sheet. The image forming section forms an image on the sheet conveyed by the conveyance section using an ink. The first light emitter emits light toward the sheet. The first light receiver receives first reflected light reflected by the sheet. The second light emitter is arranged downstream of the first light emitter in a conveyance direction of the sheet and emits light toward the sheet. The second light receiver receives second reflected light reflected by the sheet. The measuring section measures a received light quantity of each of the first reflected light and the second reflected light. The moisture content calculator calculates a change in a moisture content of the ink in the sheet based on a difference between a first moisture content and a second moisture content. The first moisture content is based on the received light quantity of the first reflected light, and the second moisture content is based on the received light quantity of the second reflected light. The curling amount calculator calculates a curling amount of the sheet based on the change in the moisture content.

DETAILED DESCRIPTION

First Embodiment

Figure 1:
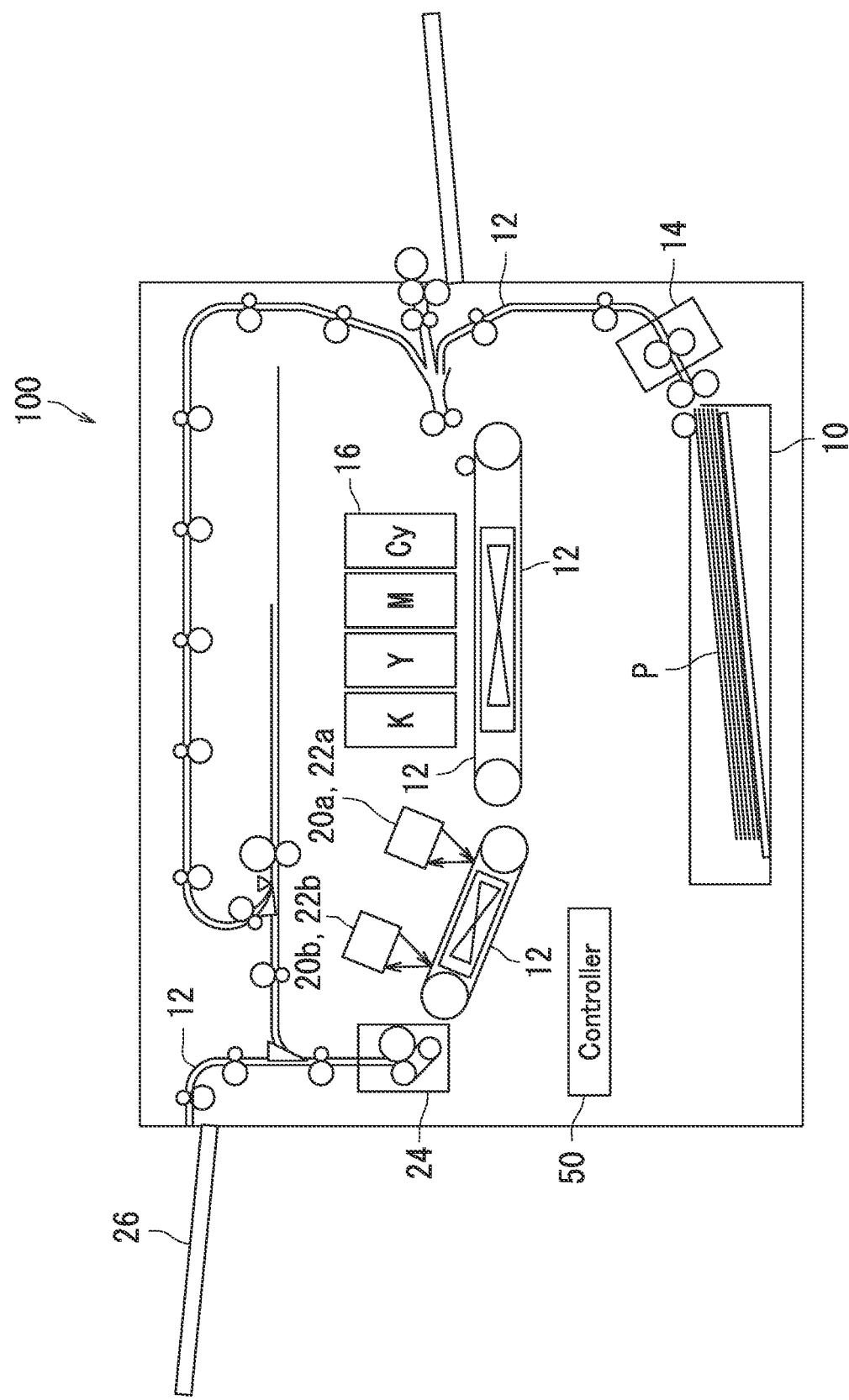
FIG. 1 is a diagram illustrating an image forming apparatus according to first and second embodiments of the present disclosure.

The following describes a first embodiment of the present disclosure with reference to FIGS. 1 to 4. Note that elements that are the same or equivalent are labeled with the same reference signs in the drawings and description thereof is not repeated. The first embodiment is applicable to all embodiments of the present application.

Figure 2:
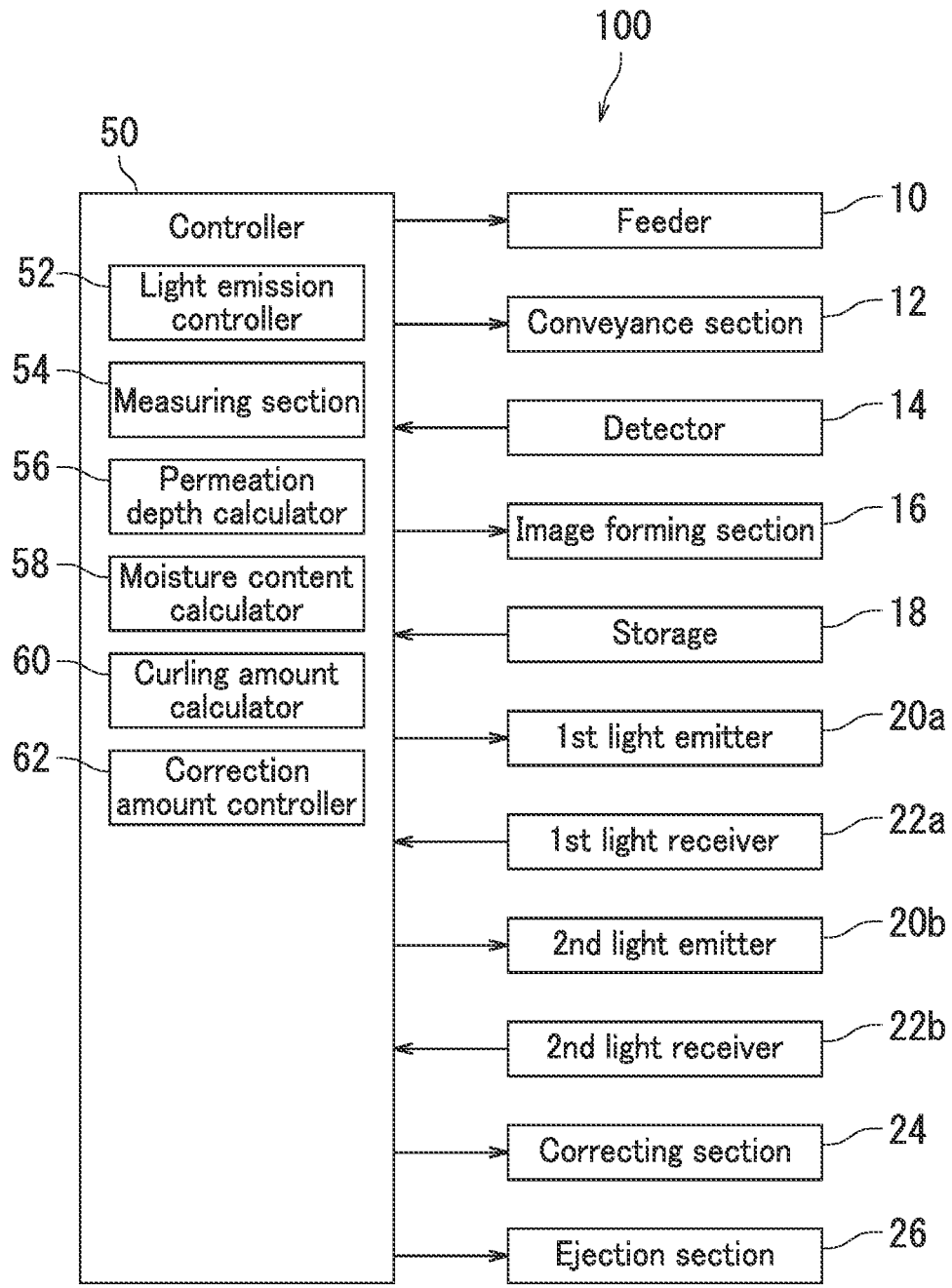
FIG. 2 is a functional block diagram of the image forming apparatus according to the first and second embodiments.
Figure 3A:
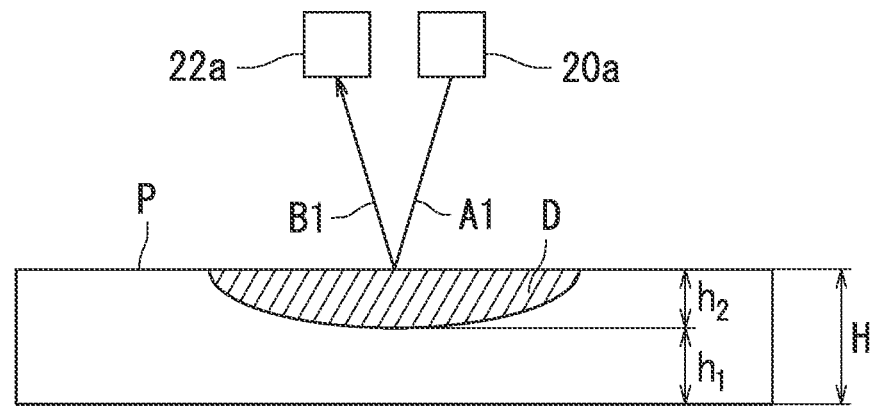
FIGS. 3A and 3B are diagrams each illustrating a light emitter and a light receiver of the image forming apparatus according to the first and second embodiments.
Figure 3B:
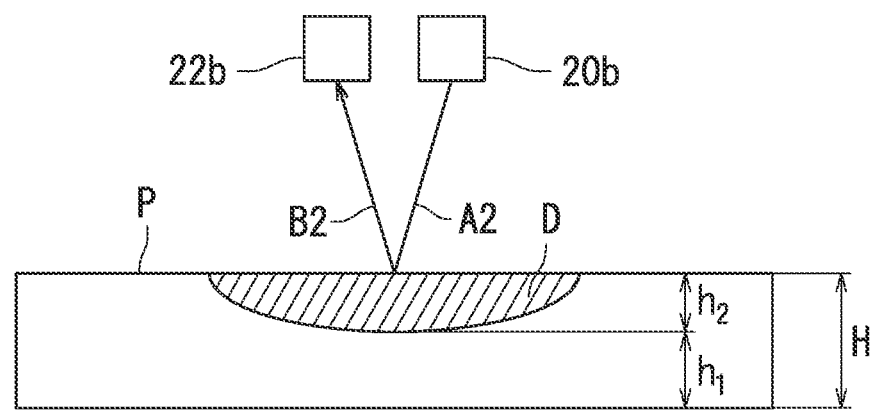
Figure 4:
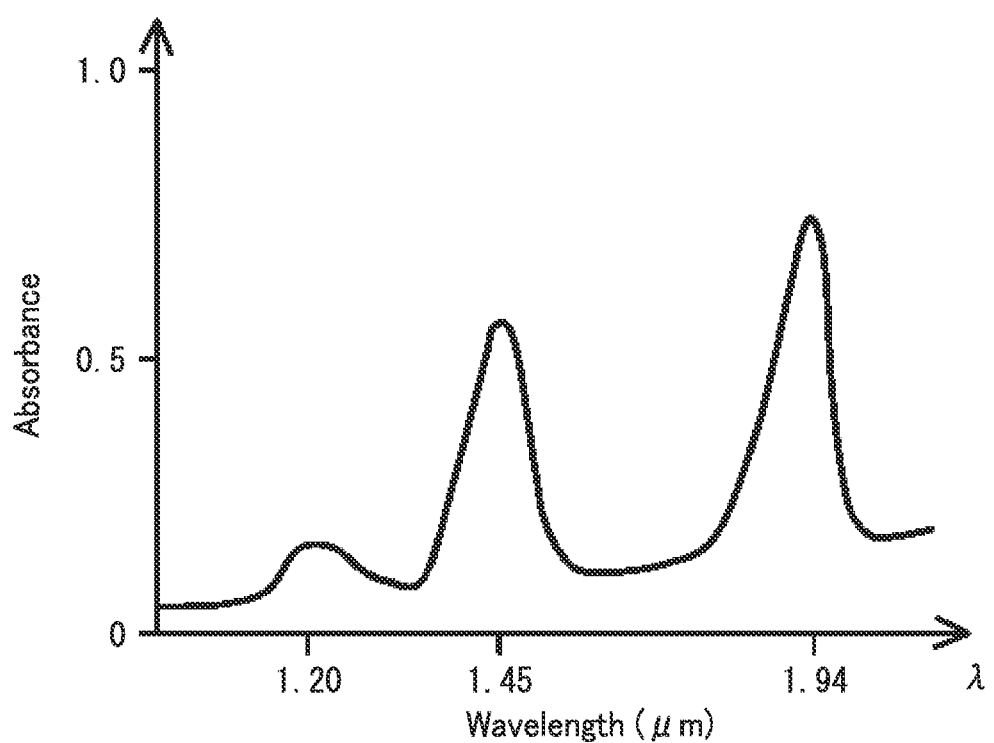
FIG. 4 is a diagram illustrating the relationship between a wavelength band and an absorbance of near-infrared light emitted by the light emitter of the image forming apparatus of the first and second embodiments.

FIG. 1 is a diagram illustrating an image forming apparatus 100 according to the first embodiment. FIG. 2 is a functional block diagram of the image forming apparatus 100 in the first embodiment. FIGS. 3A and 3B are diagrams each illustrating a light emitter 20 and a light receiver 22 of the image forming apparatus 100 in the first embodiment. FIG. 4 is a diagram illustrating the relationship between a wavelength band and an absorbance of near-infrared light A emitted by the light emitter 20 of the image forming apparatus 100 in the first embodiment.

In the first embodiment, the image forming apparatus 100 includes a feeder 10, a conveyance section 12, an image forming section 16, a first light emitter 20a, a first light receiver 22a, a second light emitter 20b, a second light receiver 22b, a measuring section 54, a moisture content calculator 58, and a curling amount calculator 60.

The feeder 10 feeds a sheet P. The conveyance section 12 conveys the sheet P. The image forming section 16 forms an image on the sheet P using an ink D. The first light emitter 20a emits light toward the sheet P. The first light receiver 22a receives first reflected light B1 that is the light emitted by the first light emitter 20a and reflected by the sheet P. The second light emitter 20b is arranged downstream of the first light emitter 20a in a conveyance direction of the sheet P, and emits light toward the sheet P.

The second light receiver 22b receives second reflected light B2 that is the light emitted by the second light emitter 20b and reflected by the sheet P. The measuring section 54 measures respective received light quantities (first received light quantity a1 and second received light quantity a2) of the first reflected light B1 and the second reflected light B2. The moisture content calculator 58 calculates a change in a moisture content S of the ink D in the sheet P based on the difference between a first moisture content S1 and a second moisture content S2. The first moisture content S1 is based on the received light quantity a (first received light quantity a1) of the first reflected light B1, and the second moisture content S2 is based on the received light quantity a (second received light quantity a2) of the second reflected light B2. The curling amount calculator 60 calculates a curling amount δ of the sheet P based on the change in the moisture content S.

In the first embodiment, the first light emitter 20a, the second light emitter 20b, the first light receiver 22a, and the second light receiver 22b of the image forming apparatus 100 are arranged on the same side of the sheet P conveyed by the conveyance section 12 as the side of the sheet P on which an image is formed using the ink D.

In the first embodiment, the image forming apparatus 100 further includes a light emission controller 52. The light emission controller 52 sets the wavelength of the near-infrared light A of the first light emitter 20a and the second light emitter 20b.

In the first embodiment, the first light emitter 20a and the second light emitter 20b of the image forming apparatus 100 each include a light emitting element which emits the near-infrared light A in any of the following wavelength bands: 1.9 µm to 2.0 µm, 1.4 µm to 1.5 µm, and 1.15 µm to 1.25 µm. The light is not limited to near-infrared light.

In the first embodiment, the light emitting element of either the first light emitter 20a or the second light emitter 20b of the image forming apparatus 100 emits the near-infrared light A with a wavelength of 1.94 µm.

In the first embodiment, the first light receiver 22a and the second light receiver 22b of the image forming apparatus 100 include photo detectors which respectively receive the first reflected light B1 and the second reflected light B2 in any of the following wavelength bands: 1.9 µm to 2.0 µm, 1.4 µm to 1.5 µm, and 1.15 µm to 1.25 µm.

In the first embodiment, the photo detector of either the first light receiver 22a or the second light receiver 22b of the image forming apparatus 100 receives light with a wavelength of 1.94 µm as a corresponding one of the first reflected light B1 and the second reflected light B2.

In the first embodiment, the image forming apparatus 100 further includes storage 18. The storage 18 stores at least one of the following: a permeation depth calculation formula for calculating a permeation depth h2 of the ink D based on the received light quantity a (first received light quantity a1) of the first reflected light B1; a moisture content calculation formula for calculating a change in the moisture content S; an elongation calculation formula for calculating a change in an elongation ε of the sheet P based on the received light quantity a (first received light quantity a1) of the first reflected light B1 and the received light quantity a (second received light quantity a2) of the second reflected light B2; a longitudinal elasticity modulus calculation formula for calculating a change in a longitudinal elasticity modulus E of the sheet P based on the change in the moisture content S; a curvature calculation formula for calculating a curvature 1/R of curling of the sheet P based on the permeation depth h2 of the ink D, the change in the elongation ε, and the change in the longitudinal elasticity modulus E; and a curling amount calculation formula for calculating the curling amount δ based on the curvature 1/R.

In the first embodiment, the curling amount calculator 60 of the image forming apparatus 100 calculates the curling amount δ of the sheet P based on the permeation depth h2, the change in the elongation ε, and the change in the longitudinal elasticity modulus E.

The image forming apparatus 100 of the first embodiment is described with reference to FIG. 1. As illustrated in FIG. 1, the image forming apparatus 100 includes a feeder 10, a conveyance section 12, a detector 14, an image forming section 16, a light emitter 20, a light receiver 22, a correcting section 24, an ejection section 26, and a controller 50.

As illustrated in FIGS. 3A and 3B, the image forming apparatus 100 forms an image on a sheet P based on image data using an ink D. A specific example of the image forming apparatus 100 is an inkjet printer. The image forming apparatus 100 is not limited to an inkjet printer.

As illustrated in FIG. 1, the feeder 10 feeds the sheet P. The feeder 10 may have a sheet feed tray and a pickup roller. The pickup roller picks up the sheet P placed on the sheet feed tray and feeds the sheet P.

The conveyance section 12 conveys the sheet P. The conveyance section 12 forms a conveyance path extending from the feeder 10 to the ejection section 26.

The detector 14 detects the sheet P fed from the feeder 10 and determines a thickness H (FIG. 3) of the sheet P. The position at which the detector 14 is arranged is not limited to the position indicated in FIG. 1. The detector 14 may be arranged in another position in the conveyance path constituting the conveyance section 12 illustrated in FIG. 1.

The image forming section 16 drops the ink D onto the sheet P to form an image on the sheet P.

The image forming section 16 preferably includes a single type of inkjet heads or a plurality of types of inkjet heads. The image forming section 16 is not limited to including inkjet heads. In a case in which the image forming apparatus 100 is a color image forming apparatus, the image forming section 16 includes cyan, magenta, yellow, and black inkjet heads, for example. The types of inkjet heads may include three or less of cyan, magenta, yellow, and black inkjet heads, or may include more than cyan, magenta, yellow, and black inkjet heads.

The inkjet heads eject the ink D onto the sheet P. The ink D is supplied to each of the inkjet heads. An example of the ink D is water-based ink. The ink D is not limited to water-based ink. The color of the ink D may vary for each inkjet head.

As illustrated in FIGS. 3A and 3B, the first light emitter 20a and the second light emitter 20b emit light toward the sheet P with an image formed thereon. The light is preferably the near-infrared light A (first near-infrared light A1 and second near-infrared light A2). The following description may refer only to near-infrared light A unless it is necessary to specifically refer to first near-infrared light A1 or second near-infrared light A2.

As illustrated in FIGS. 1 and 3A, the first light emitter 20a emits the first near-infrared light A1 for example in a specific wavelength band. A specific example of the first light emitter 20a is a light-emitting diode (LED). As described later with reference to FIG. 2, the first light emitter 20a may emit first near-infrared light A1 for which the wavelength band is controlled by the light emission controller 52. The second light emitter 20b may emit second near-infrared light A2 for which the wavelength band is controlled by the light emission controller 52.

As illustrated in FIGS. 1 and 3A, the first light receiver 22a receives the first reflected light B1 which is the first near-infrared light A1 reflected by the sheet P. The following description may refer only to reflected light B unless it is necessary to specifically refer to first reflected light B1 or second reflected light B2.

As illustrated in FIG. 4, the reflected light B has near-infrared absorption characteristics distinct to the moisture content S of the ink D contained in the sheet P. Therefore, the received light quantity a of the reflected light B is used to calculate the permeation depth h2 of the ink D applied to the sheet P.

A specific example of the first light receiver 22a is a charge-coupled device (CCD) or a complementary metal-oxide-semiconductor (CMOS) image sensor.

In a case in which the first light receiver 22a is a CCD, for example, an amount of stored charge changes according to the first received light quantity a1 of the first reflected light B1. The following description may refer only to a received light quantity a unless it is necessary to specifically refer to a first received light quantity a1.

The first light emitter 20a and the first light receiver 22a are arranged downstream of the image forming section 16 in the conveyance direction of the sheet P.

As illustrated in FIGS. 1 and 3B, the second light emitter 20b emits the second near-infrared light A2 to the sheet P. That is, the second light emitter 20b emits the second near-infrared light A2 in a prescribed wavelength band. The wavelength band of the second near-infrared light A2 may be the same as the wavelength band of the first near-infrared light A1 emitted by the first light emitter 20a. A specific example of the second light emitter 20b may be the same as that of the first light emitter 20a. The following description may refer only to near-infrared light A unless it is necessary to specifically refer to second near-infrared light A2.

The second light receiver 22b receives second reflected light B2 of the second near-infrared light A2. That is, the second light receiver 22b receives the second reflected light B2 which is the second near-infrared light A2 reflected by the sheet P. A specific example of the second light receiver 22b may be the same as that of the first light receiver 22a. The following description may refer only to reflected light B unless it is necessary to specifically refer to second reflected light B2.

As illustrated in FIG. 1, the second light emitter 20b and the second light receiver 22b are arranged downstream of the first light emitter 20a and the first light receiver 22a in the conveyance direction of the sheet P.

The following description may refer only to a light emitter 20 unless it is necessary to specifically refer to a first light emitter 20a or a second light emitter 20b. The following description may refer only to a light receiver 22 unless it is necessary to specifically refer to a first light receiver 22a or a second light receiver 22b.

As illustrated in FIGS. 3A and 3B, the first light emitter 20a, the second light emitter 20b, the first light receiver 22a, and the second light receiver 22b are arranged on the same side of the sheet P conveyed by the conveyance section 12 as the side of the sheet on which an image is formed using the ink D.

As illustrated in FIG. 1, also, the light emitter 20 and the light receiver 22 are arranged on the same side of the sheet P conveyed by the conveyance section 12 as the side of the sheet P on which an image is formed using the ink D.

According to the present embodiment, a change in the moisture content S in the sheet P can be calculated because the near-infrared light A is radiated directly to the moisture of the ink D.

As illustrated in FIG. 1, the correcting section 24 decurls the sheet P on which an image is formed using the ink D. Specifically, as illustrated in FIG. 1, the correcting section 24 is arranged in the conveyance path of the conveyance section 12, downstream of the second light emitter 20b and the second light receiver 22b and upstream of the ejection section 26 in the conveyance direction of the sheet P.

An example of the correcting section 24 is constituted by a combination of a plurality of rollers, and may decurl the sheet P when the sheet P passes through a nip of the rollers.

Another example of the correcting section 24 may be a heater. Specifically, the correcting section 24 may decurl the sheet P by blowing warm air from a heater to the conveyed sheet P.

The ejection section 26 ejects the sheet P out of the apparatus. The ejection section 26 may have an exit tray. The ejection section 26 is arranged at the end of the conveyance path of the conveyance section 12 and uses a roller to eject the sheet P. The ejection section 26 may include an exit tray. The sheet P ejected by the roller is placed on the exit tray.

The controller 50 controls operation of each constituent element of the image forming apparatus 100. A specific example of the controller 50 is a central processing unit (CPU).

Figure 5:
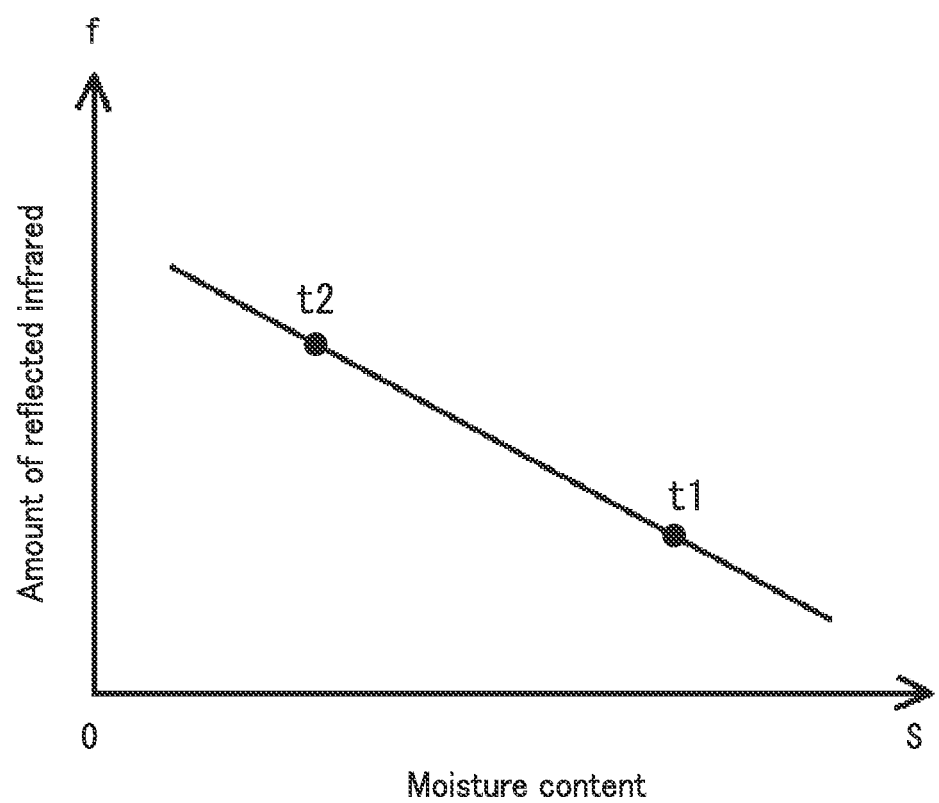
FIG. 5 is a diagram illustrating the relationship between a moisture content in a sheet and reflected light in the image forming apparatus of the first and second embodiments.
Figure 6A:
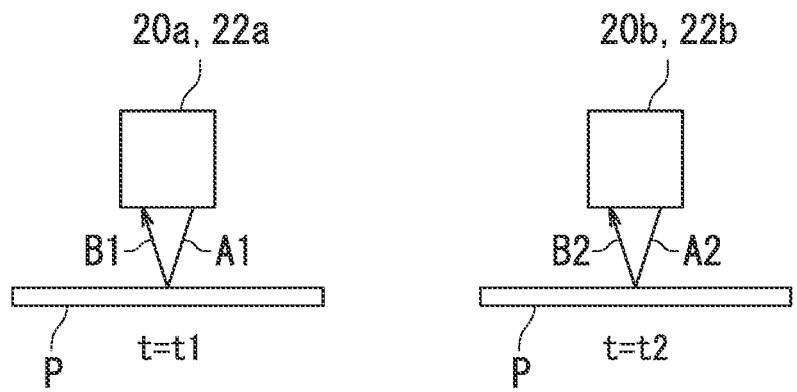
FIGS. 6A and 6B are diagrams each illustrating a change in the moisture content in the sheet in the image forming apparatus of the first and second embodiments.
Figure 6B:
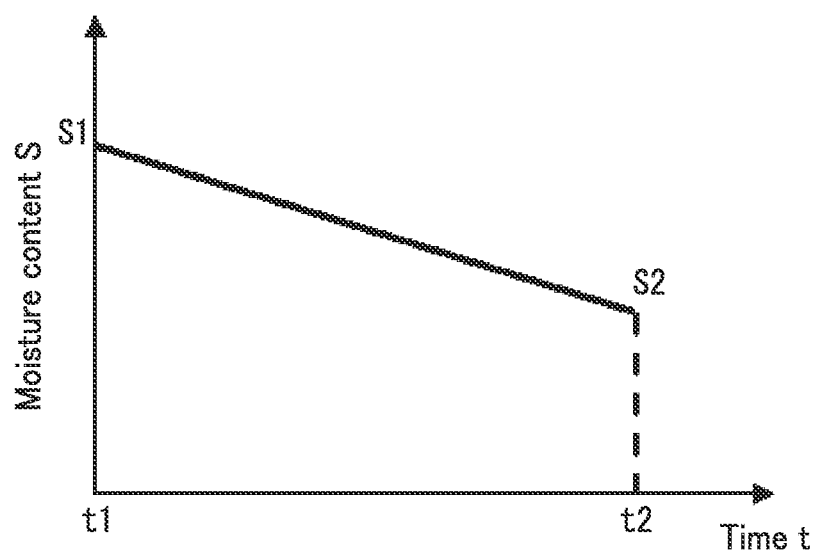
Figure 7:
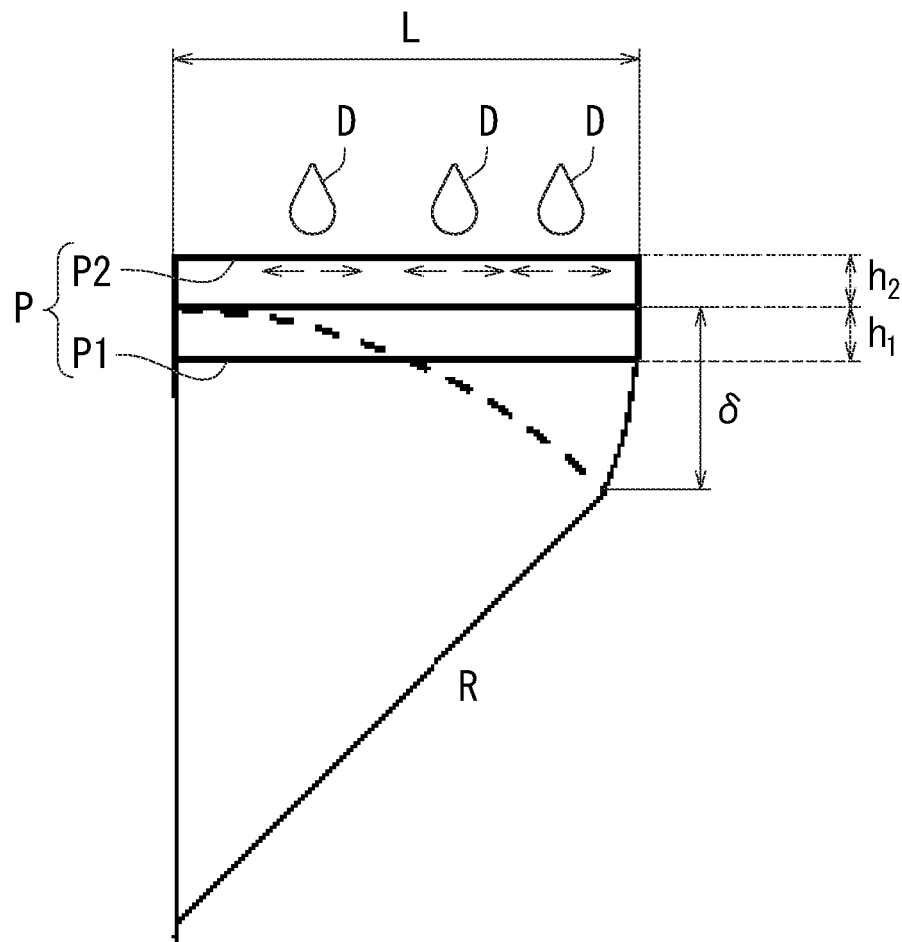
FIG. 7 is a diagram illustrating a curling amount of the sheet in the image forming apparatus of the first and second embodiments.

Next, each constituent element is described following a flow of information in the image forming apparatus 100 of the first embodiment with reference to FIGS. 5 to 7 in addition to FIGS. 1 to 4.

FIG. 5 is a diagram illustrating the relationship between the moisture content S in the sheet P and the reflected light B in the image forming apparatus 100 of the first embodiment. FIGS. 6A and 6B are diagrams illustrating a change in the moisture content S in the sheet P in the image forming apparatus 100 of the first embodiment. FIG. 7 is a diagram illustrating the curling amount δ of the sheet P in the image forming apparatus 100 of the first embodiment.

As illustrated in FIG. 2, the image forming apparatus 100 includes a feeder 10, a conveyance section 12, a detector 14, an image forming section 16, storage 18, a first light emitter 20a, a first light receiver 22a, a second light emitter 20b, a second light receiver 22b, a correcting section 24, an ejection section 26, and a controller 50. The controller 50 controls operation of these constituent elements.

Duplicate description with reference to FIG. 2 for constituent elements previously described with reference to FIG. 1 is omitted.

As illustrated in FIG. 2, the controller 50 includes a light emission controller 52, a measuring section 54, a permeation depth calculator 56, a moisture content calculator 58, a curling amount calculator 60, and a correction amount controller 62.

The controller 50 controls the operation of each constituent element of the light emission controller 52, the measuring section 54, the permeation depth calculator 56, the moisture content calculator 58, the curling amount calculator 60, and the correction amount controller 62.

Programs for implementing the light emission controller 52, the measuring section 54, the permeation depth calculator 56, the moisture content calculator 58, the curling amount calculator 60, and the correction amount controller 62 are installed to the storage 18. The programs are executed by the CPU.

As illustrated in FIG. 2, the detector 14 detects the sheet P fed from the feeder 10 and measures the sheet thickness H (FIG. 3) of the sheet P. A specific example of the detector 14 is an ultrasonic wave transmitter. An ultrasonic wave transmitter sends transmission waves, which are ultrasonic waves, to the sheet P fed from the feeder 10 and measures the intensity of transmitted waves penetrating through the sheet P or the reflected light B reflected by the sheet P to determine the sheet thickness H.

The detector 14 may for example be constituted by a plurality of opposing rollers along a sheet conveyance path, and the detector 14 may detect the sheet thickness H of the sheet P based on a nip clearance when the sheet P passes between the rollers. The detector 14 outputs sheet thickness information indicating the sheet thickness H.

The storage 18 stores wavelength information therein. The wavelength information indicates a designated wavelength of the near-infrared light A. In a case in which the light emitter 20 emits the near-infrared light A in a wavelength band controlled by the light emission controller 52, the storage 18 stores therein wavelength information related to the wavelength band. In a case in which the wavelength band of the light emitted by the light emitter 20 is specified according to the characteristics of a material, the storage 18 may not store the wavelength information therein.

The storage 18 includes a storage device and stores data and computer programs therein. Specifically, the storage 18 includes a main storage device such as semiconductor memory and an auxiliary storage device such as either or both semiconductor memory and a hard disk drive.

Specifically, the wavelength information indicates wavelength bands from 1.9 µm to 2.0 µm, from 1.4 µm to 1.5 µm, and from 1.15 µm to 1.25 µm. More specifically, the wavelength information indicates 1.94 µm, 1.45 µm, and 1.2 µm. The wavelength information is one example, and is not limited to these values or wavelength bands.

Here, as illustrated in FIG. 4, the absorbance at which the near-infrared light A emitted by the light emitter 20 is absorbed in moisture varies depending on the wavelength band of the near-infrared light A. The absorbance indicates a proportion of the light quantity absorbed by the moisture in the sheet P to the light quantity of the near-infrared light A emitted from the light emitter 20. That is, as the absorbance increases, the near-infrared light A is increasingly absorbed by the moisture in the sheet P, and as the absorbance decreases, the near-infrared light A is increasingly reflected without being absorbed by the moisture in the sheet P.

When the wavelength band of the near-infrared light A is 1.9 µm to 2.0 µm, 1.4 µm to 1.5 µm, or 1.15 µm to 1.25 µm, the absorbance is generally high, and the absorbance peaks at 1.94 µm, 1.45 µm, and 1.2 µm, respectively.

As such, the light emitting element of the light emitter 20 emits the near-infrared light A in any of the following wavelength bands: 1.9 µm to 2.0 µm, 1.4 µm to 1.5 µm, and 1.15 µm to 1.25 µm. The light emitting element of the light emitter 20 preferably emits the near-infrared light A with any of the following wavelengths: 1.94 µm, 1.45 µm, and 1.2 µm. The light emitting element of the light emitter 20 more preferably emits the near-infrared light A with a wavelength of 1.94 µm.

The photo detector of the light receiver 22 receives the reflected light B in any of the following wavelength bands: 1.9 µm to 2.0 µm, 1.4 µm to 1.5 µm, and 1.15 µm to 1.25 µm. The photo detector of the light receiver 22 preferably receives the reflected light B with any of the following wavelengths: 1.94 µm, 1.45 µm, and 1.2 µm. The photo detector of the light receiver 22 more preferably receives the reflected light B with a wavelength of 1.94 µm.

The light emission controller 52 of the controller 50 acquires the wavelength information from the storage 18. The light emission controller 52 sets the wavelength of the near-infrared light A emitted by the light emitter 20 based on the wavelength information. The near-infrared light A is electromagnetic waves with a wavelength of approximately 0.7 µm to 2.5 µm, which is close to that of visible red light. The wavelength of the near-infrared light A is not limited to 0.7 µm to 2.5 µm.

The light emission controller 52 can set a specific wavelength range of the near-infrared light A through a user setting. In a case in which the wavelength band of the light emitted by the light emitter 20 is specified according to the characteristics of a material of the light emitter 20, the light emission controller 52 is not a required constituent element.

According to the present embodiment, the wavelength of the near-infrared light A can be favorably set to calculate the moisture content S in the sheet P.

As illustrated in FIGS. 1 and 3A, the measuring section 54 of the controller 50 measures the first received light quantity a1 of the first reflected light B1. That is, the measuring section 54 measures the first received light quantity a1 of the first reflected light B1 received by the first light receiver 22a and outputs light quantity information indicating the first received light quantity a1 of the first reflected light B1. The first received light quantity a1 is used in the following later-described formulas: a permeation depth calculation formula for calculating the permeation depth h2 to which the ink D permeates the sheet P; and a moisture calculation formula for calculating a change in the moisture content S in the sheet P over time.

As illustrated in FIG. 2, the storage 18 stores therein the permeation depth calculation formula indicating the relationship between the first received light quantity a1 and the permeation depth h2 to which the ink D permeates the sheet P and the moisture content calculation formula for calculating the moisture content S in the sheet P. The storage 18 is not limited to storing all of these formulas. The storage 18 may store some of these formulas.

The storage 18 may store a prescribed function f(a) therein. The storage 18 may store therein a table indicating the relationship between the permeation depth h2 and the first received light quantity a1.

The permeation depth h2 to which the ink D permeates the sheet P is given by the permeation depth calculation formula (formula 1).

$$h_2 = f(a) \quad \text{(formula 1)}$$

The permeation depth calculator 56 of the controller 50 calculates the permeation depth h2 of the ink D based on the first received light quantity a1. As illustrated in FIG. 3A, the permeation depth h2 is a depth to which the ink D dropped onto the sheet P has soaked into the sheet P.

Specifically, the permeation depth calculator 56 calculates the permeation depth h2 by reading out (formula 1) from the storage 18 and substituting the first received light quantity a1 into the function f(a) of (formula 1).

Because the sheet thickness H has been detected by the detector 14, a non-permeation depth h1 is calculated by substituting the permeation depth h2 into H=h1+h2 as illustrated in FIG. 3A. The non-permeation depth h1 is a depth in the sheet thickness H which is not permeated by the ink D.

Calculating the permeation depth h2 based on the first received light quantity a1 of the first reflected light B1 received by the first light receiver 22a means calculating the permeation depth h2 based on the moisture content S in the sheet P. The non-permeation depth h1 and the permeation depth h2 are used to calculate a curvature 1/R of curling of the sheet P which is described later in FIG. 7. The following description may refer only to reflected light B unless it is necessary to specifically refer to first reflected light B1.

The moisture content calculator 58 of the controller 50 calculates the first moisture content S1 at time t1 based on the first received light quantity a1 of the first reflected light B1 received by the first light receiver 22a with reference to FIG. 5. The first moisture content S1 is used in the later-described moisture content calculation formula.

Next, the second light emitter 20b emits the second near-infrared light A2 to the sheet P. The second light receiver 22b receives second reflected light B2 which is the second near-infrared light A2 reflected by the sheet P.

The measuring section 54 of the controller 50 measures a second received light quantity a2 of the second reflected light B2. That is, the measuring section 54 measures the second received light quantity a2 of the second reflected light B2 received by the second light receiver 22b and outputs light quantity information indicating the second received light quantity a2 of the second reflected light B2. The following description may refer only to a received light quantity a unless it is necessary to specifically refer to a second received light quantity a2.

As illustrated in FIG. 5, the relationship between the received light quantity a of the reflected light B of the near-infrared light A and the moisture content S of the ink D applied to the sheet P is characterized such that the received light quantity a of the reflected light B increases as the moisture content S of the ink D decreases and the received light quantity a of the reflected light B decreases as the moisture content S of the ink D increases.

Specifically, as illustrated in FIGS. 1 and 5, the moisture content S in the sheet P changes between time t1 at which the sheet P passes the first light emitter 20a and the first light receiver 22a and time t2 at which the sheet P passes the second light emitter 20b and the second light receiver 22b due to the moisture of the ink D evaporating from the sheet P.

That is, as illustrated in FIG. 6A, the first light emitter 20a emits the first near-infrared light A1 to the sheet P and the first light receiver 22a receives the first reflected light B1 with the first received light quantity a1 corresponding to the first moisture content S1 in the sheet P at time t1. The following description may refer to a moisture content S unless it is necessary to specifically refer to a first moisture content S1.

As illustrated in FIG. 6B, the second light emitter 20b emits the second near-infrared light A2 to the sheet P and the second light receiver 22b receives the second reflected light B2 with the second received light quantity a2 corresponding to the second moisture content S2 in the sheet P at time t2. The following description may refer to a moisture content S unless it is necessary to specifically refer to a second moisture content S2.

The change in the moisture content S in the sheet P over time is given by the moisture calculation formula (formula 2).

$$S(t)=S_0-K \cdot t \quad \text{(formula 2)}$$

The moisture content calculator 58 of the controller 50 calculates the first moisture content S1 at time t1 based on the first received light quantity a1 of the first reflected light B1 received by the first light receiver 22a with reference to FIG. 5. The moisture content calculator 58 calculates the second moisture content S2 at time t2 based on the second received light quantity a2 of the second reflected light B2 received by the second light receiver 22b.

The moisture content calculator 58 calculates the time difference (t2−t1) between time t1 and time t2. The moisture content calculator 58 calculates a coefficient K by substituting the time difference (t2−t1), the first moisture content S1, and the second received light quantity a2 into (formula 2). The coefficient K is used to calculate the elongation ε of the sheet P as later described.

The storage 18 further stores an elongation calculation formula and a longitudinal elasticity modulus calculation formula therein. The storage 18 is not limited to storing all of these formulas. The storage 18 may store some of these formulas.

The elongation ε of the sheet P is given by the elongation calculation formula (formula 3).

$$\varepsilon(t)=K \cdot f(t) \quad \text{(formula 3)}$$

Next, the curling amount calculator 60 of the controller 50 illustrated in FIG. 2 acquires (formula 3) from the storage 18 and calculates a change in the elongation ε. That is, the curling amount calculator 60 calculates a change in the elongation ε by multiplying f(t) in (formula 3) by the coefficient K. f in (formula 3) may be a function differing from f in previously described (formula 1).

Specifically, as illustrated in FIG. 5, the curling amount calculator 60 obtains the first received light quantity a1 corresponding to the first moisture content S1 at time t1 and the second received light quantity a2 corresponding to the second moisture content S2 at time t2.

The curling amount calculator 60 substitutes the first received light quantity a1 in the function f to obtain a first elongation ε1. The curling amount calculator 60 substitutes the second received light quantity a2 in the function f to obtain a second elongation ε2. As a result, the curling amount calculator 60 obtains (ε2−ε1). (ε2−ε1) is used to calculate the later-described curvature 1/R.

The longitudinal elasticity modulus E of the sheet P is given by the longitudinal elasticity modulus calculation formula (formula 4).

$$E_2(S)=E_1 \cdot G(S) \quad \text{(formula 4)}$$

As an example of the longitudinal elasticity modulus calculation formula in the first embodiment, the longitudinal elasticity modulus E of a sheet P without the ink D applied thereto is assumed as a first longitudinal elasticity modulus E1, and the longitudinal elasticity modulus E of a sheet P at time t2 (FIG. 5) to which the ink D has been applied and which has been conveyed to the second light emitter 20b and the second light receiver 22b illustrated in FIG. 1 is assumed as a second longitudinal elasticity modulus E2.

A function G may be a function obtained through arbitrary selection, and is preferably a function which uses the moisture content S in the sheet P as a variable. The second longitudinal elasticity modulus E2 is the first longitudinal elasticity modulus E1 multiplied by a numerical value obtained by substituting the second moisture content S2 at time t2 in the function G.

The first longitudinal elasticity modulus E1 and the second longitudinal elasticity modulus E2 are used to calculate the curvature 1/R of curling of the sheet P (P1+P2). The first longitudinal elasticity modulus E1 or the second longitudinal elasticity modulus E2 may be referred to as a longitudinal elasticity modulus E unless it is necessary to specifically refer to a first longitudinal elasticity modulus E1 or a second longitudinal elasticity modulus E2.

The storage 18 further stores a curvature calculation formula and a curling amount calculation formula therein. The storage 18 is not limited to storing all of these formulas. The storage 18 may store some of these formulas.

The curvature 1/R of curling of the sheet P (P1) is given by the curvature calculation formula (formula 5). The curvature 1/R is used to calculate the curling amount δ of the sheet P (P1).

$$\frac{1}{R} = \frac{6(\varepsilon_2 - \varepsilon_1)(h_1 + h_2)h_1 h_2 E_1 E_2}{3(h_1 + h_2)^2 h_1 h_2 E_1 E_2 + (h_1 E_1 + h_2 E_2)(h_1^3 E_1 + h_2^3 E_2)} \quad \text{(formula 5)}$$

The curling amount calculator 60 acquires (formula 5) from the storage 18 and calculates the curvature 1/R. Specifically, the curling amount calculator 60 calculates the curvature 1/R by substituting the above-mentioned (ε2−ε1), the non-permeation depth h1, the permeation depth h2, the first longitudinal elasticity modulus E1, and the second longitudinal elasticity modulus E2 in (formula 5).

The curling amount δ of curling of the sheet P (P1) is given by the curling amount calculation formula (formula 6).

$$\delta = \frac{L^2}{2R} \quad \text{(formula 6)}$$

The curling amount calculator 60 acquires (formula 6) from the storage 18 and calculates the curling amount δ. Specifically, the curling amount calculator 60 calculates the curling amount δ by substituting the curvature 1/R and a sheet length L illustrated in FIGS. 3A and 3B in (formula 6).

According to the present embodiment, the curling amount δ of the sheet P (P1) can be easily calculated based on the calculation formulas.

Also according to the present embodiment, the curling amount δ of the sheet P can be favorably calculated by calculating a change in the moisture content S in the sheet P.

Second Embodiment

The following describes an image forming apparatus 100 according to a second embodiment with reference to FIGS. 1 to 7.

In the second embodiment, the image forming apparatus 100 further includes a correcting section 24. The correcting section 24 decurls a sheet P.

As illustrated in FIG. 7, the controller 50 of the image forming apparatus 100 further includes a correction amount controller 62. The correction amount controller 62 adjusts a correction amount for decurling the sheet P by the correcting section 24 based on the curling amount δ.

In a case in which the correcting section 24 is constituted by rollers, the correction amount controller 62 adjusts the correction amount for decurling the sheet P by the rollers of the correcting section 24 based on the curling amount δ calculated by the curling amount calculator 60.

That is, when the curling amount δ is small, the correction amount controller 62 decreases the urging amount of the rollers. When the curling amount δ is large, the correction amount controller 62 increases the urging amount of the rollers. The rollers may be combined so as to apply the urging force in a direction opposite to the direction in which the sheet P is curled.

In a case in which the correcting section 24 is constituted by a heater, the correction amount controller 62 adjusts an amount of electricity supplied to the heater of the correcting section 24 for heating the sheet P based on the curling amount δ calculated by the curling amount calculator 60.

According to the present embodiment, the sheet P can be favorably decurled.

Also according to the present embodiment, the urging amount of the rollers or the amount of electricity supplied to the heater can be favorably adjusted based on the curling amount δ of the sheet P.

Figure 8:
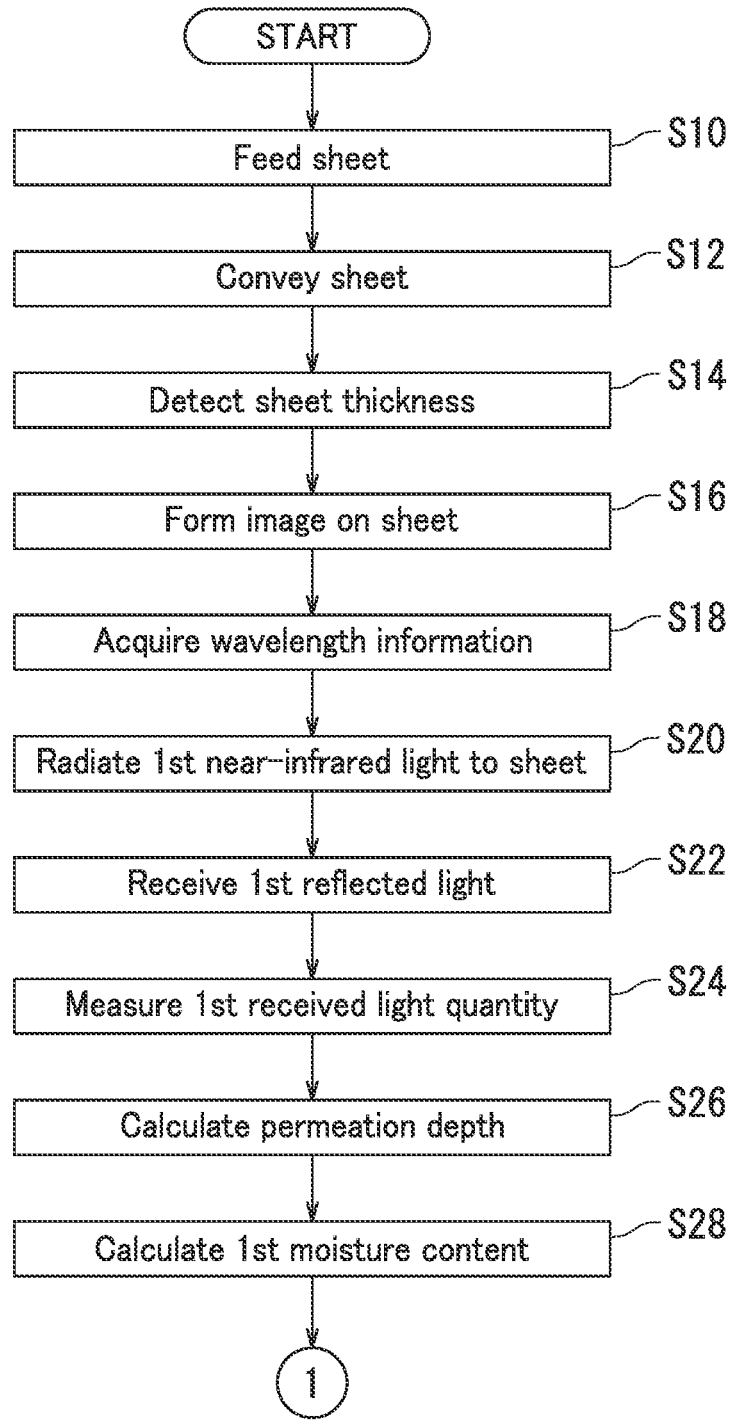
FIG. 8 is a flowchart depicting control of the image forming apparatus in the first and second embodiments.
Figure 9:
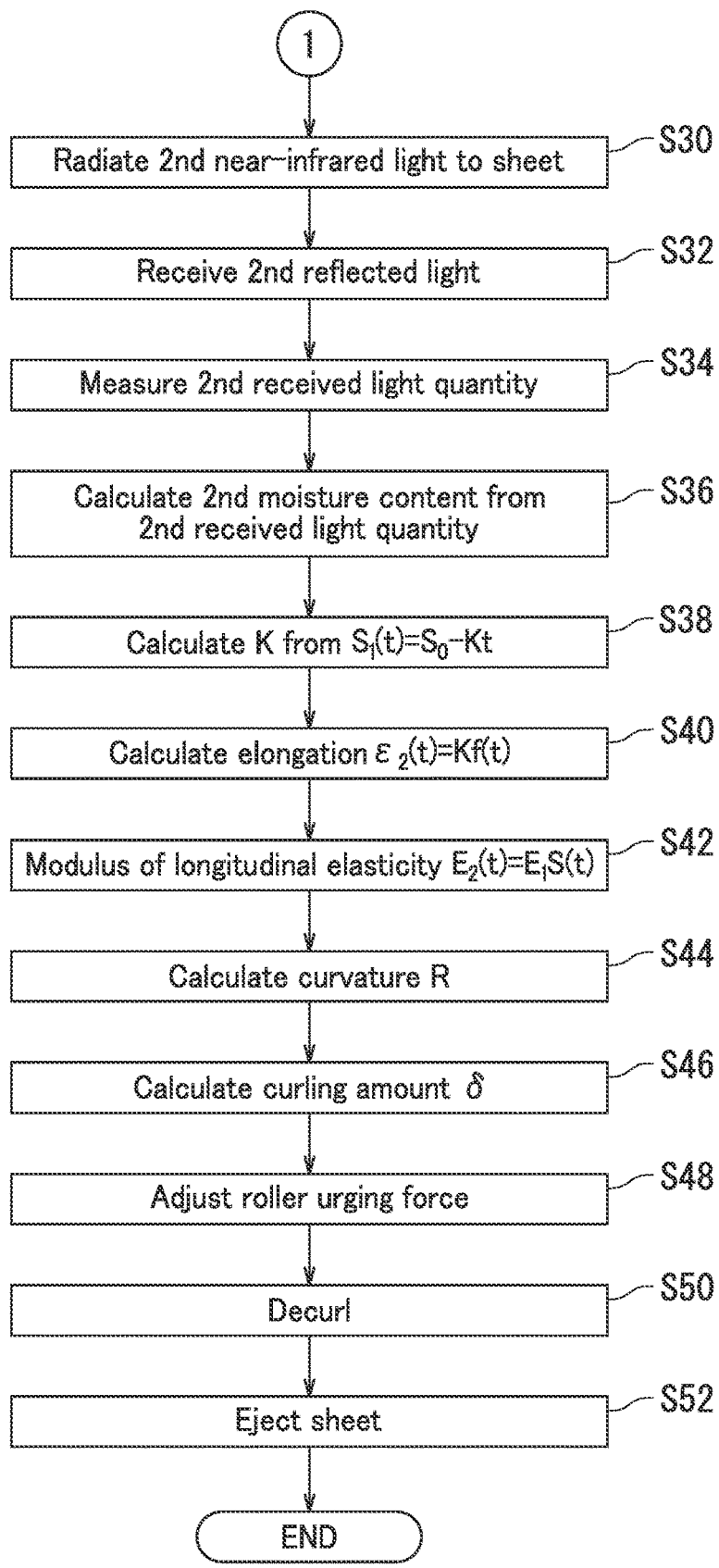
FIG. 9 is a flowchart depicting control of the image forming apparatus in the first and second embodiments.

Next, a control flow of the image forming apparatus 100 according to the first and second embodiments is described with reference to FIGS. 8 and 9. FIGS. 8 and 9 are flowcharts depicting control of the image forming apparatus 100 in the first and second embodiments.

As depicted in FIGS. 8 and 9, the process includes Steps S10 to S50. A specific description is as follows.

As depicted in FIG. 8, the feeder 10 feeds a sheet P in Step S10. The process advances to Step S12.

In Step S12, the conveyance section 12 conveys the sheet P. The process advances to Step S14.

In Step S14, the detector 14 detects the sheet P to determine the sheet thickness H of the sheet P. The process advances to Step S16.

In Step S16, the image forming section 16 forms an image on the sheet P. The process advances to Step S18.

In Step S18, the light emission controller 52 acquires the wavelength information. The process advances to Step S20.

In Step S20, the first light emitter 20a emits the first near-infrared light A1 to the sheet P. The process advances to Step S22.

In Step S22, the first light receiver 22a receives the first reflected light B1 of the first near-infrared light A1. The process advances to Step S24.

In Step S24, the measuring section 54 measures the first received light quantity a1 of the first reflected light B1. The process advances to Step S26.

As depicted in FIG. 8, the permeation depth calculator 56 calculates the permeation depth h2 of the ink D based on the first received light quantity a1 in Step S26. The process advances to Step S28.

In Step S28, the moisture content calculator 58 calculates the first moisture content S1 in the sheet P. The process advances to Step S30.

In Step S30, the second light emitter 20b emits the second near-infrared light A2 to the sheet P. The process advances to Step S32.

In Step S32, the second light receiver 22b receives the second reflected light B2 of the second near-infrared light A2. The process advances to Step S34.

In Step S34, the measuring section 54 measures the second received light quantity a2 of the second reflected light B2. The process advances to Step S36.

In Step S36, the moisture content calculator 58 calculates the second moisture content S2. The process advances to Step S38.

In Step S38, the moisture content calculator 58 calculates the coefficient K from (formula 2). The process advances to Step S40.

In Step S40, the curling amount calculator 60 calculates the elongation ε from (formula 3). The process advances to Step S42.

In Step S42, the curling amount calculator 60 calculates the longitudinal elasticity modulus E from (formula 4). The process advances to Step S44.

In Step S44, the curling amount calculator 60 calculates the curvature 1/R from (formula 5). The process advances to Step S46.

In Step S46, the curling amount calculator 60 calculates the curling amount δ. The process advances to Step S48.

In Step S48, the correction amount controller 62 adjusts a decurling amount of the sheet P and the process advances to Step S50.

In Step S50, the correcting section 24 decurls the sheet P. The process advances to Step S52.

In Step S52, the ejection section 26 ejects the sheet P out of the apparatus. The process then ends.

Embodiments of the present disclosure are described above with reference to the accompanying drawings. However, the present disclosure is not limited to the above embodiments and may be implemented in various manners within a scope not departing from the gist thereof. Furthermore, various disclosures may be created by appropriately combining constituent elements disclosed in the above embodiments. For example, some constituent elements may be removed from all of the constituent elements illustrated in the embodiments. Alternatively or additionally, the constituent elements may be appropriately combined across different embodiments. The drawings mainly illustrate the constituent elements schematically to facilitate understanding thereof. The constituent elements may differ in practice for convenience of drawing preparation. Furthermore, the constituent elements illustrated in the above embodiments are each one example and not particular limitations. The constituent elements may be variously altered within a scope not substantially departing from the configuration of the present disclosure.

What is claimed is:

1. An image forming apparatus comprising:
a feeder configured to feed a sheet;
a conveyance section configured to convey the sheet;
an image forming section configured to form an image on the sheet conveyed by the conveyance section using an ink;
a first light emitter configured to emit light toward the sheet;
a first light receiver configured to receive first reflected light reflected by the sheet;
a second light emitter arranged downstream of the first light emitter in a conveyance direction of the sheet and configured to emit light toward the sheet;
a second light receiver configured to receive second reflected light reflected by the sheet;
a measuring section configured to measure a received light quantity of each of the first reflected light and the second reflected light;
a moisture content calculator configured to calculate a change in a moisture content of the ink in the sheet based on a difference between a first moisture content and a second moisture content, the first moisture content being based on the received light quantity of the first reflected light, the second moisture content being based on the received light quantity of the second reflected light; and
a curling amount calculator configured to calculate a curling amount of the sheet based on the change in the moisture content.

2. The image forming apparatus according to claim 1, wherein
the first light emitter, the second light emitter, the first light receiver, and the second light receiver are arranged on the same side of the sheet conveyed by the conveyance section as a side of the sheet on which the image is formed using the ink.

3. The image forming apparatus according to claim 1, further comprising
a light emission controller configured to set a wavelength of near-infrared light that is the light emitted by each of the first light emitter and the second light emitter.

4. The image forming apparatus according to claim 3, wherein
the first light emitter and the second light emitter each have a light emitting element which emits the near-infrared light, the near-infrared light being in any of the following wavelength bands: 1.9 µm to 2.0 µm; 1.4 µm to 1.5 µm; and 1.15 µm to 1.25 µm.

5. The image forming apparatus according to claim 4, wherein
the near-infrared light emitted by the light emitting element of either of the first light emitter or the second light emitter has a wavelength of 1.94 µm.

6. The image forming apparatus according to claim 4, wherein
the first light receiver and the second light receiver include photo detectors which respectively receive the first reflected light and the second reflected light, the first reflected light and the second reflected light being in any of the following wavelength bands: 1.9 µm to 2.0 µm; 1.4 µm to 1.5 µm; and 1.15 µm to 1.25 µm.

7. The image forming apparatus according to claim 6, wherein
either the first reflected light received by the first light receiver or the second reflected light received by the second light receiver has a wavelength of 1.94 µm.

8. The image forming apparatus according to claim 1, further comprising storage storing therein at least one of:
a permeation depth calculation formula for calculating a permeation depth of the ink based on the received light quantity of the first reflected light;
a moisture content calculation formula for calculating a change in the moisture content in the sheet;
an elongation calculation formula for calculating a change in an elongation of the sheet based on the received light quantity of the first reflected light and the received light quantity of the second reflected light;
a longitudinal elasticity modulus calculation formula for calculating a change in a longitudinal elasticity modulus of the sheet based on the change in the moisture content in the sheet;
a curvature calculation formula for calculating a curvature of curling of the sheet based on the permeation depth of the ink, the change in the elongation of the sheet, and the change in the longitudinal elasticity modulus of the sheet; and
a curling amount calculation formula for calculating the curling amount of the sheet based on the curvature of the curling of the sheet.

9. The image forming apparatus according to claim 8, wherein
the curling amount calculator calculates the curling amount of the sheet based on the permeation depth of the ink, the change in the elongation of the sheet, and the change in the longitudinal elasticity modulus of the sheet.

10. The image forming apparatus according to claim 1, further comprising
a correcting section configured to decurl the sheet.

11. The image forming apparatus according to claim 10, further comprising
a correction amount controller configured to adjust a correction amount for decurling the sheet by the correcting section based on the curling amount of the sheet.

* * * * *